(12) United States Patent
Michiyama

(10) Patent No.: US 9,517,716 B2
(45) Date of Patent: Dec. 13, 2016

(54) LIGHT SENSOR

(71) Applicant: DENSO CORPORATION, Kariya, Aichi-pref. (JP)

(72) Inventor: Katsunori Michiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/029,643

(22) PCT Filed: Oct. 30, 2014

(86) PCT No.: PCT/JP2014/005490
§ 371 (c)(1),
(2) Date: Apr. 15, 2016

(87) PCT Pub. No.: WO2015/072101
PCT Pub. Date: May 21, 2015

(65) Prior Publication Data
US 2016/0272108 A1  Sep. 22, 2016

(30) Foreign Application Priority Data

Nov. 18, 2013  (JP) .................................. 2013-237546

(51) Int. Cl.
*B60Q 1/02* (2006.01)
*B60Q 1/08* (2006.01)
*G01J 1/42* (2006.01)
*B60Q 1/14* (2006.01)

(52) U.S. Cl.
CPC ................. *B60Q 1/08* (2013.01); *B60Q 1/143* (2013.01); *G01J 1/4204* (2013.01); *G01J 1/4228* (2013.01); *B60Q 2300/314* (2013.01)

(58) Field of Classification Search
CPC .............. B60R 1/088; B60R 1/12; B60R 1/04; B60R 2001/1223; B60R 2001/1284; B60R 1/1207;B60R 2001/1215; B60R 11/04; B60R 2022/208; B60R 21/0134; B60R 21/01534; B60R 21/01536; B60R 21/01538
See application file for complete search history.

(56) References Cited

U.S. PATENT DOCUMENTS 6,376,824 B1    4/2002  Michenfelder et al.
2015/0367772 A1* 12/2015  Salter ....................... B60Q 1/26
                                              362/466

FOREIGN PATENT DOCUMENTS

JP    2007-030739 A    2/2007
JP    2007-320487 A    12/2007
JP    2010-163001 A    7/2010

OTHER PUBLICATIONS

International Search Report of the International Searching Authority dated Dec. 9, 2014, issued in the corresponding International application No. PCT/JP2014/005490 (and English translation).

* cited by examiner

*Primary Examiner* — Monica C King
(74) *Attorney, Agent, or Firm* — Posz Law Group, PLC

(57) ABSTRACT

In a light sensor, an operational determination circuit determines based on first and second intensity signals respectively indicative of intensities of light irradiated from above and ahead of a vehicle whether the vehicle is positioned under a shield structure, determines whether it is necessary to turn on a light in the vehicle for the shield structure, and outputs a result of determination as a determination signal. A communication output circuit receives the first intensity signal and the determination signal, and outputs information to a control unit whether it is necessary to turn on the light for the shield structure when the vehicle is positioned under the shield structure.

7 Claims, 8 Drawing Sheets

LIGHT SENSOR

CROSS REFERENCE TO RELATED APPLICATIONS

This application is the U.S. national phase of International Patent Application No. PCT/JP2014/005490 filed on Oct. 30, 2014, and is based on Japanese Patent Application No. 2013-237546 filed on Nov. 18, 2013, the disclosures of which are incorporated herein by reference.

TECHNICAL FIELD

The present disclosure relates to a light sensor for receiving light from above a vehicle and from ahead of the vehicle.

BACKGROUND ART

Patent Literature 1 discloses a light sensor which is one of conventional light sensors and which includes a first light receiving portion for detecting light ahead of a vehicle, a second light receiving portion for detecting light above the vehicle, and a control circuit portion for determining whether a light in the vehicle is turned on or off on the basis of signals from the light receiving portions.

With the structure of such a light sensor, timing when the light intensity detected by the first light receiving portion is lowered to below a threshold value is different from timing when the light intensity detected by the second light receiving portion is lowered to below a threshold value. Accordingly, the light sensor does not turn on the light in the vehicle under a constructed structure such as a bridge girder.

However, with the aforementioned conventional technique, the light sensor includes the control circuit portion adapted to determine whether the light is turned on or off, as well as to detect light. This induces the problem of complicacy of the structure of the light sensor and, furthermore, induces the problem of an increase of the size of the light sensor. There has been a need for reduction of the sizes of light sensors, because such a light sensor is mounted on a front glass, a dash board, or the like.

PRIOR ART LITERATURES

Patent Literature

Patent Literature 1: U.S. Pat. No. 6,376,824

SUMMARY OF INVENTION

It is an object of the present disclosure to provide a light sensor having a reduced size for use in turning on or off a light in a vehicle, According to an aspect of the present disclosure, a light sensor includes: a first light receiving element; a second light receiving element, an operational determination circuit, and a communication output circuit. The first light receiving element outputs a first intensity signal indicative of a first intensity which is an intensity of light irradiated from above a vehicle. The second light receiving element outputs a second intensity signal indicative of a second intensity which is an intensity of light irradiated from ahead of the vehicle.

The operational determination circuit receives the first intensity signal from the first light receiving element and the second intensity signal from the second light receiving element, determines based on the first intensity signal and the second intensity signal whether the vehicle is positioned under a shield structure for intercepting sunlight, determines whether it is necessary to turn on a light in the vehicle for the shield structure when the vehicle is positioned under the shield structure, and outputs a result of determination as a determination signal.

The communication output circuit receives the first intensity signal from the first light receiving element and the determination signal from the operational determination circuit portion, generates an output signal having information about the first intensity indicated by the first intensity signal, and outputs the output signal to a control unit for controlling to turn on or off the light based on the output signal.

The communication output circuit outputs the output signal to the control unit, the output signal including information whether it is necessary to turn on the light for the shield structure when the vehicle is positioned under the shield structure.

When the vehicle is positioned under the shield structure, the light sensor causes the communication output circuit portion to output the output signal which includes information about whether or not the light is turned on for the shield structure. Therefore, the automatic light turning on/off system employing the light sensor can cause the control unit to control turning on or off of the light depending on the shield structure, which can prevent the light from being wrongly turned on when the light is not required to be turned on for the shield structure. Accordingly, with the automatic light turning on/off system employing the light sensor, there is no need for mounting an additional sensor on the front glass, which enables reduction of the size of the light sensor.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments of the present disclosure will be described, with reference to the drawings. Further, (First Embodiment)

Hereinafter, a first embodiment of the present disclosure will be described with reference to the drawings. A light sensor according to the present embodiment can be applied to an automatic light turning on/off system for automatically turning on and off a tail light or a head light of an automobile when the automobile has entered under a shield structure for intercepting sunlight, such as a bridge girder or a tunnel, in the daytime.

Figure 1:
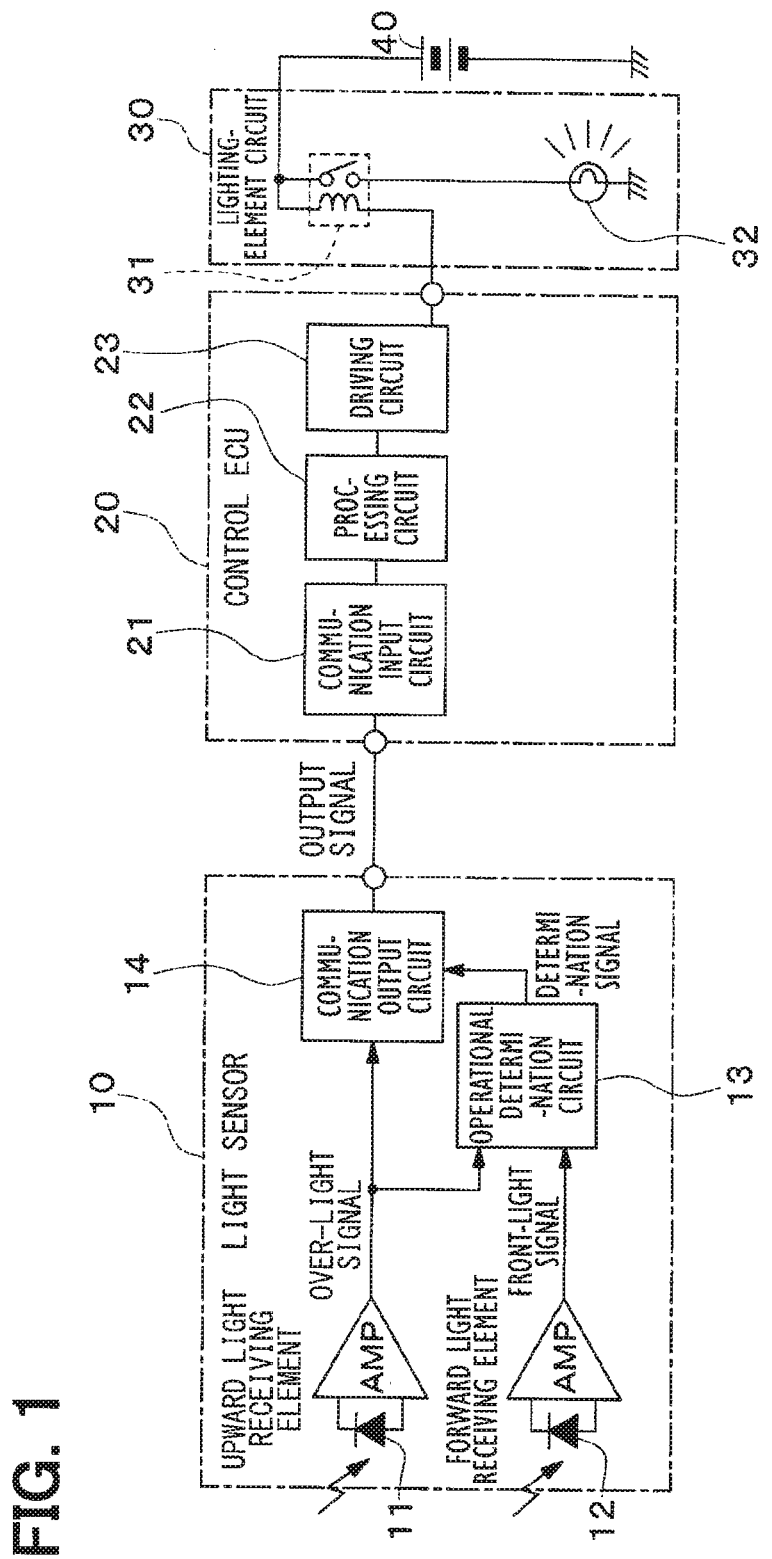
FIG. 1 is a view of the structure of an automatic light turning on/off system including a light sensor according to a first embodiment of the present disclosure.

As illustrated in FIG. 1, the automatic light turning on/off system includes a light sensor 10, a control ECU 20, a lighting-element circuit portion 30, and an on-vehicle battery 40. The lighting-element circuit portion 30 includes a switch 31 and a light 32.

The switch 31 is connected between the on-vehicle battery 40 and the light 32 and is controlled to be turned on and off by the control ECU 20. The switch 31 is constituted by a relay, for example. The light 32 is constituted by a tail light or a head light which is mounted on a vehicle. The light 32 can be turned on by being supplied with a power supply from the on-vehicle battery 40.

The light sensor 10 includes an upward light receiving element 11, a forward light receiving element 12, an operational determination circuit portion 13, and a communication output circuit portion 14.

Figure 2:
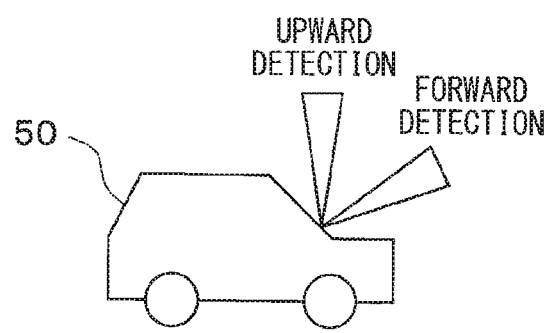
FIG. 2 is a schematic view illustrating a state where respective light receiving elements detect light above a vehicle and light ahead of the vehicle.

As illustrated in FIG. 2, the upward light receiving element 11 is an element for detecting light directed from above the vehicle 50. The upward light receiving element 11 has coherence having a peak around 80 degrees to 100 degrees with respect to 0 degrees, assuming that the forward direction of the vehicle (the horizontal direction) is at 0 degrees, and the angle is defined from the front of the vehicle to the rear of the vehicle. The upward light receiving element 11 includes a photodiode for detecting the intensity (the brightness) of received light, and an amplification circuit (AMP) adapted to perform amplification and the like on signals from the photodiode. Accordingly, the upward light receiving element 11 detects light above the vehicle 50 through the photodiode and also amplifies the intensity of this light through the amplification circuit. Further, the upward light receiving element 11 outputs the amplified intensity of the light as an over-light signal to the operational determination circuit portion 13 and the communication output circuit portion 14.

On the other hand, the forward light receiving element 12 is an element for detecting light directed from ahead of the vehicle 50. The forward light receiving element 12 has coherence having a peak around 0 degrees to 40 degrees with respect to 0 degrees, assuming that the forward direction of the vehicle (the horizontal direction) is at 0 degrees, and the angle is defined from the front of the vehicle to the rear of the vehicle. The forward light receiving element 12 includes a photodiode and an amplification circuit (AMP), similarly to the upward light receiving element 11. The forward light receiving element 12 detects light ahead of the vehicle through the photodiode and also amplifies the intensity (the brightness) of this light through the amplification circuit. Further, the forward light receiving element 12 outputs, to the operational determination circuit portion 13, the amplified intensity of the light as a front-light signal.

The upward light receiving element 11 and the forward light receiving element 12 may be either formed in a single semiconductor chip or formed individually.

The operational determination circuit portion 13 receives the over-light signal from the upward light receiving element 11 and the front-light signal from the forward light receiving element 12, and the operational determination circuit portion 13 determines whether or not the vehicle 50 is being positioned under a shield structure for intercepting sunlight, such as a bridge girder or a tunnel, based on the over-light signal and the front-light signal. In this case, such a shield structure includes a constructed structure such as a roof, an arch made of wood, and the like, as well as a bridge girder and a tunnel. In the present embodiment, a bridge girder and a tunnel are defined as a shield structure.

Figure 3:
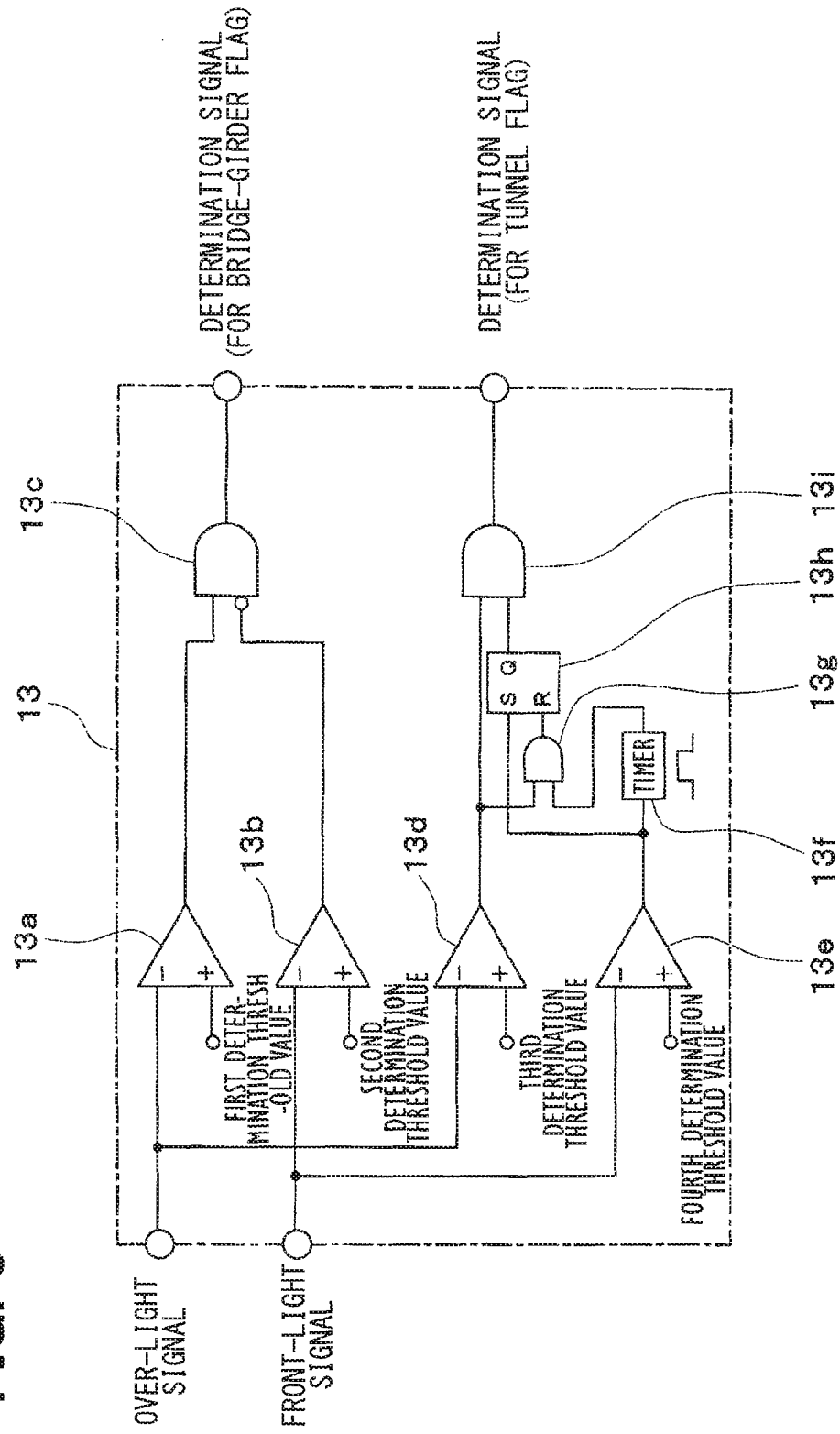
FIG. 3 is a circuit diagram of an operational determination circuit portion.

Specifically, the operational determination circuit portion 13 determines whether or not the light 32 is turned on for a shield structure, if the vehicle 50 is being positioned under the shield structure, based on the respective intensities of the over-light signal and the front-light signal. As illustrated in FIG. 3, the operational determination circuit portion 13 includes a first comparator 13a, a second comparator 13b and a first AND circuit 13c for bridge-girder determination. Further, the operational determination circuit portion 13 includes a third comparator 13d, a fourth comparator 13e, a timer 13f, a second AND circuit 13g, a flip-flop 13h, and a third AND circuit 13i for tunnel determination.

The first comparator 13a compares the over-light signal and a first determination threshold value and outputs a high-level signal if the over-light signal is lower than the first determination threshold value. The first determination threshold value is a threshold value for determining whether or not a bridge girder exists above the vehicle 50. The second comparator 13b compares the front-light signal and a second determination threshold value arid outputs a high-level signal if the front-light signal is lower than the second determination threshold value. The second determination threshold value is a threshold value for determining whether or not a bridge girder exists ahead of the vehicle 50.

The comparison result by the first comparator 13a is inputted to the first AND circuit 13c, and the inversion of the comparison result by the second comparator 13b is inputted to the first AND circuit 13c. Further, if the first comparator 13a outputs a high level and the second comparator 13b outputs a low level, the first AND circuit 13c outputs a high-level determination signal indicating that the vehicle 50 is being positioned under a bridge girder.

The third comparator 13d compares the over-light signal and a third determination threshold value and outputs a high-level signal if the over-light signal is lower than the third determination threshold value. The third determination threshold value is a threshold value for determining whether or not a tunnel exists above the vehicle 50. The fourth comparator 13e compares the front-light signal and a fourth determination threshold value and outputs a high-level signal if the front-light signal is lower than the fourth determination threshold value. The fourth determination threshold value is a threshold value for determining whether or not a tunnel exists ahead of the vehicle 50.

The timer 13f counts a predetermined time period by using the rising of the signal inputted from the fourth comparator 13e, as a trigger. The timer 13f keeps outputting a high-level signal to the second AND circuit 13g, while counting the predetermined time period. If the vehicle 50 enters a tunnel, a portion ahead of the vehicle 50 is darkened and, after the elapse of the predetermined time period, a portion above the vehicle 50 is darkened. In order to perform determination, the timer 13f counts the predetermined time period.

The second AND circuit 13*g* outputs a high-level signal, if the third comparator 13*d* outputs a high level and the timer 13*f* also outputs a high level. The second AND circuit 13*g* is connected at its output terminal to a reset terminal (R) of the flip flop 13*h*.

The flip flop 13*h* is a circuit which is adapted to hold the output, which is inputted to a set terminal (S), of the fourth comparator 13*e* and to output the output from an output terminal (Q), and further, is adapted to reset the output of the output terminal (Q) through a high-level signal from the second AND circuit 13*g*, the high-level signal being inputted to a reset terminal (R).

The third AND circuit 13*i* outputs a high-level determination signal indicating that the vehicle 50 is being positioned in a tunnel, if the third comparator 13*d* outputs a high level and the flip flop 13*h* outputs a high level.

With this configuration, the operational determination circuit portion 13 determines that a shield structure which requires the light 32 to be turned on for the shield structure is a tunnel. Further, the operational determination circuit portion 13 determines that a shield structure which does not require the light 32 to be turned on for the shield structure is a constructed structure having higher brightness at the front of the shield structure, such as a bridge girder. Further, the operational determination circuit portion 13 outputs the determination result as a determination signal, to the communication output circuit portion 14. On the other hand, when the vehicle 50 is not being positioned under a shield structure, the operational determination circuit portion 13 determines that there exists no shield structure and causes the first AND circuit 13*c* and the second AND circuit 13*g* to output low-level determination signals. Further, the operational determination circuit portion 13 performs the determination at a predetermined time cycle and outputs a determination signal to the communication output circuit portion 14 at a predetermined time cycle, for example.

The communication output circuit portion 14 receives the over-light signal from the upward light receiving element 11, and the communication output circuit portion 14 generates an output signal including an upper portion of the light intensity indicated by the over-light signal and outputs this output signal to the control ECU 20. Further, the communication output circuit portion 14 receives the determination signal from the operational determination circuit portion 13. If the determination result includes the fact that the vehicle 50 is being positioned under a shield structure, the communication output circuit portion 14 output, to the control ECU 20, an output signal including information indicating the fact that the shield structure is a bridge girder or a tunnel.

Further, if the operational determination circuit portion 13 determines that the vehicle 50 is not being positioned under the shield structure after determining the vehicle 50 as being positioned under the shield structure, the communication output circuit portion 14 output, to the control ECU 20, an output signal including information indicating the fact that the vehicle 50 is not being positioned under the shield structure.

The communication output circuit portion 14 generates and outputs the output signal in a signal format which conforms to an on-vehicle network, such as serial communication, Universal Asynchronous Receiver Transmitter (UART), Controller Area Network (CAN), Local Interconnect Network (LN). The output signal is a digital signal.

Figure 4:
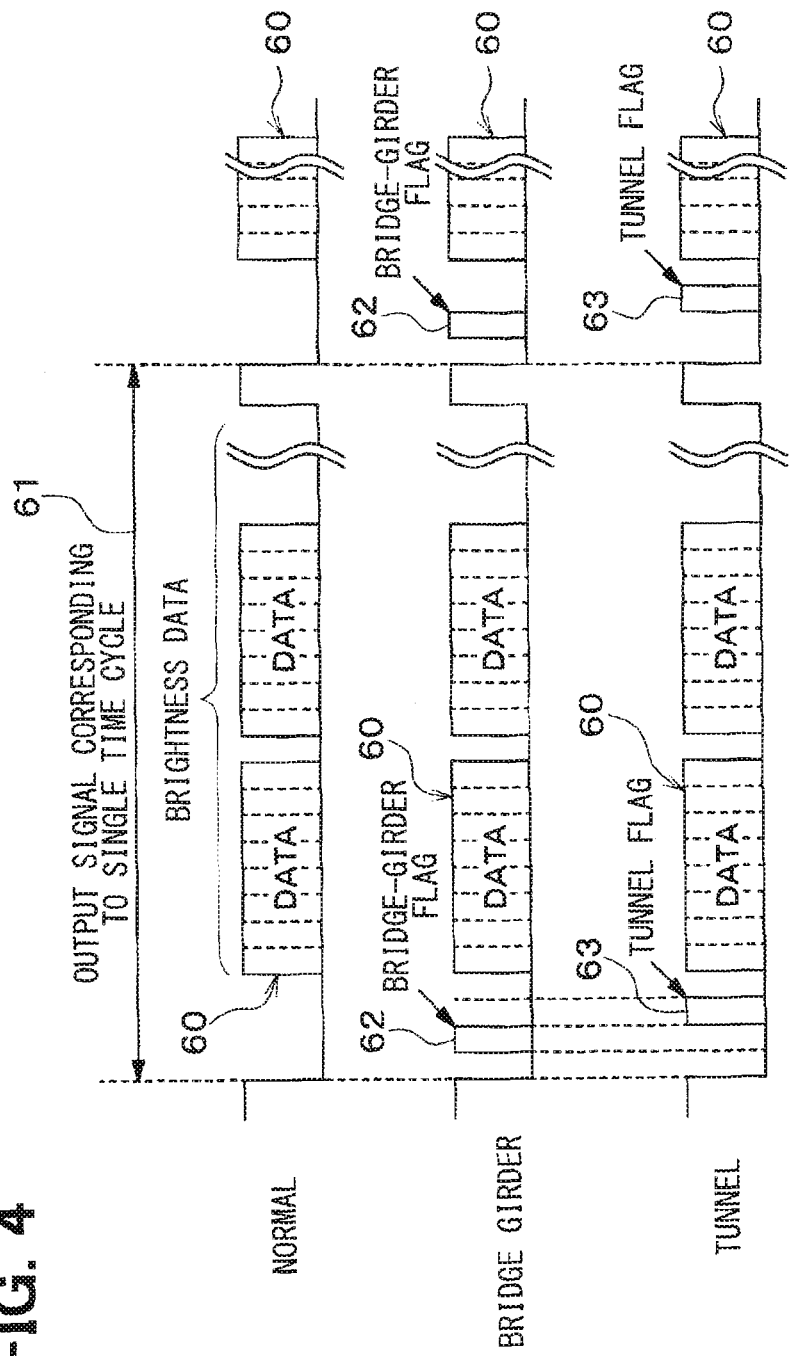
FIG. 4 is a schematic view of output signals generated by a communication output circuit portion.
Figure 5:
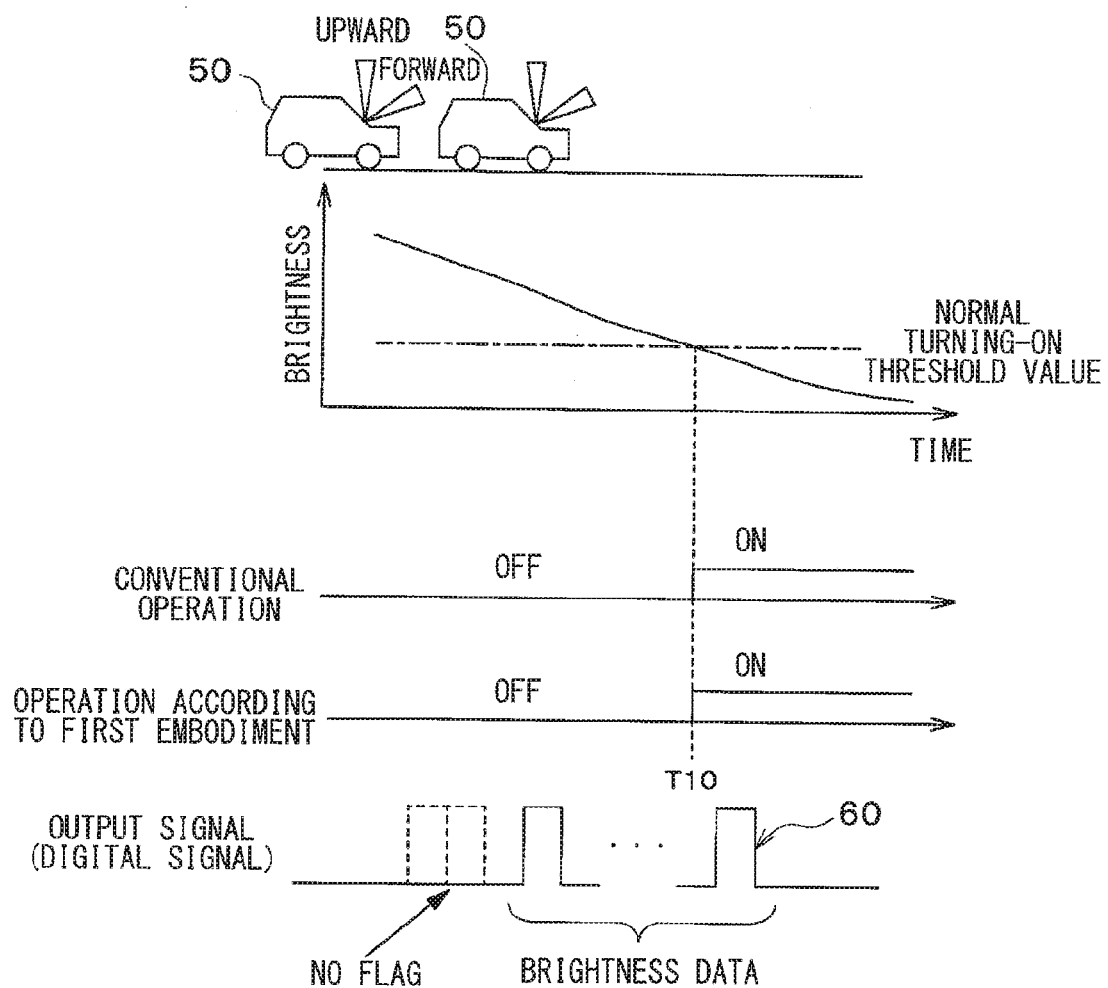
FIG. 5 is a view for explaining operations and signal processing of the automatic light turning on/off system, in a case where there is no shield structure above the vehicle.

Specifically, as illustrated in FIG. 4, the communication output circuit portion 14 generates a frame 61 storing brightness data 60 about the light intensity indicated by the over-light signal as the output signal and, further, outputs this frame 61 to the control ECU 20. A single frame 61 is a single mass of data.

Further, the communication output circuit portion 14 generates a frame 61 based on the determination result by the operational determination circuit portion 13. At first, in a normal state where the vehicle 50 is not being positioned under a shield structure, the communication output circuit portion 14 generates and outputs a frame 61 including brightness data 60, as illustrated in the upper stage in FIG. 4. The frame 61 includes no information about a shield structure.

When the vehicle 50 is being positioned under a bridge girder, the communication output circuit portion 14 generates and outputs a frame 61 which includes the brightness data 60 and which has a bridge-girder flag 62 for indicating as information that the shield structure is a bridge girder, as illustrated in the middle stage in FIG. 4.

When the vehicle 50 is being positioned under a tunnel, the communication output circuit portion 14 generates and outputs a frame 61 which includes the brightness data 60 and which has a tunnel flag 63 for indicating as information that the shield structure is a tunnel, as illustrated in the lower stage in FIG. 4.

As described above, when the vehicle 50 is being positioned under a shield structure, a flag corresponding to the shield structure, as information indicative of the shield structure, is set in the frame 61. Each of the bridge girder flag 62 and the tunnel flag 63 is set ahead of the brightness data 60 in the frame 61. On the other hand, when the vehicle 50 is not being positioned under a shield structure, none of the bridge girder flag 62 and the tunnel flag 63 is set in the frame 61. The communication output circuit portion 14 transmits the aforementioned frame 61 as an output signal to the control ECU 20 at a predetermined communication speed.

The light sensor 10 has the aforementioned configuration. The upward light receiving element 11, the forward light receiving element 12, the operational determination circuit portion 13, and the communication output circuit portion 14, which have been described above, are packaged into a single component as the light sensor 10, which is mounted on the dashboard or the like in the vehicle 50. Further, the operational determination circuit portion 13 and the communication output circuit portion 14 may be formed on a single semiconductor chip.

The control ECU 20 is an electrical control unit which is mounted on the vehicle 50 and is adapted to control turning on and off of the light 32 in the vehicle 50, based on the output signal from the light sensor 10. The control ECU 20 includes a communication input circuit portion 21, a processing circuit portion 22, and a driving circuit portion 23.

The communication input circuit portion 21 is an interface for receiving the output signal from the light sensor 10. The communication input circuit portion 21 outputs the received output signal to the processing circuit portion 22.

The processing circuit portion 22 has a determination function of determining whether or not the light 32 in the vehicle 50 is turned on. Therefore, the processing circuit portion 22 has a normal turning-on threshold value for performing this determination. Further, the processing circuit portion 22 has a function as follows. If the output signal includes information indicating that the vehicle 50 is being positioned under a bridge girder or a tunnel, that is, if the bridge-girder flag 62 or the tunnel flag 63 is set in the frame 61, the processing circuit portion 22 changes the normal turning-on threshold value in accordance with this information. Further, the processing circuit portion 22 determines whether or not the brightness data 60 included in the output signal exceeds the normal turning-on threshold value and operates the driving circuit portion 23 in accordance with the determination result.

For example, if the output signal includes the bridge-girder flag 62, the processing circuit portion 22 changes over from the normal turning-on threshold value to a bridge-girder determination turning-on threshold value which is smaller than the normal turning-on threshold value in order to make it harder to turn on the light 32. On the other hand, if the output signal includes the tunnel flag 63, the processing circuit portion 22 changes over from the normal turning-on threshold value to a tunnel determination turning-on threshold value which is larger than the normal turning-on threshold value in order to cause the light 32 to be turned on earlier.

The driving circuit portion 23 has a driving function of turning on or off the switch 31 in accordance with commands from the processing circuit portion 22. That is, the driving circuit portion 23 turns the switch 31 on for turning the light 32 on and turns the switch 31 off for turning the light 32 off. The automatic light turning on/off system according to the present embodiment has the entire structure described above.

Next, there will be described operations of the light sensor 10 in the daytime. At first, there will be described a normal state where the vehicle 50 is not travelling under a shield structure, In this case, the light sensor 10 detects the brightness around the vehicle 50.

As illustrated in Fig, 5, when the vehicle 50 is not travelling under a shield structure, the operational determination circuit portion 13 in the light sensor 10 compares the over-light signal and the predetermined threshold value and compares the front-light signal and the predetermined threshold value, to determine that the vehicle 50 is not being positioned under a shield structure. Further, the operational determination circuit portion 13 outputs a determination signal including the result of this determination to the communication output circuit portion 14. As a result, the communication output circuit portion 14 outputs a frame 61 which includes the brightness data 60 of the over-light signal, as an output signal, such that no flag is set in the frame 61.

The processing circuit portion 22 in the control ECU 20 acquires the brightness data 60 included in the output signal through the communication input circuit portion 21 and compares the brightness above the vehicle which is indicated by this brightness data 60 and the normal turning-on threshold value. For example, the periphery of the vehicle 50 is darkened with the elapse of time, and the brightness above the vehicle 50 is lowered to below the normal turning-on threshold value at a time point T10. Thus, the processing circuit portion 22 operates the lighting-element circuit portion 30 through the driving circuit portion 23, to turn on the light 32.

As described above, when the vehicle 50 is not travelling under a shield structure, the control ECU 20 turns on the light 32 in accordance with the brightness outside the vehicle 50. Accordingly, in the present disclosure, the operation for turning on the light 32 if the brightness above the vehicle 50 is lowered to below the normal turning-on threshold value is the same as those in conventional techniques. If the brightness above the vehicle 50 exceeds the normal turning-on threshold value after the elapse of a time period since the time point T10, the control ECU 20 operates the lighting-element circuit portion 30 through the driving circuit portion 23, to turn off the light 32.

Figure 6:
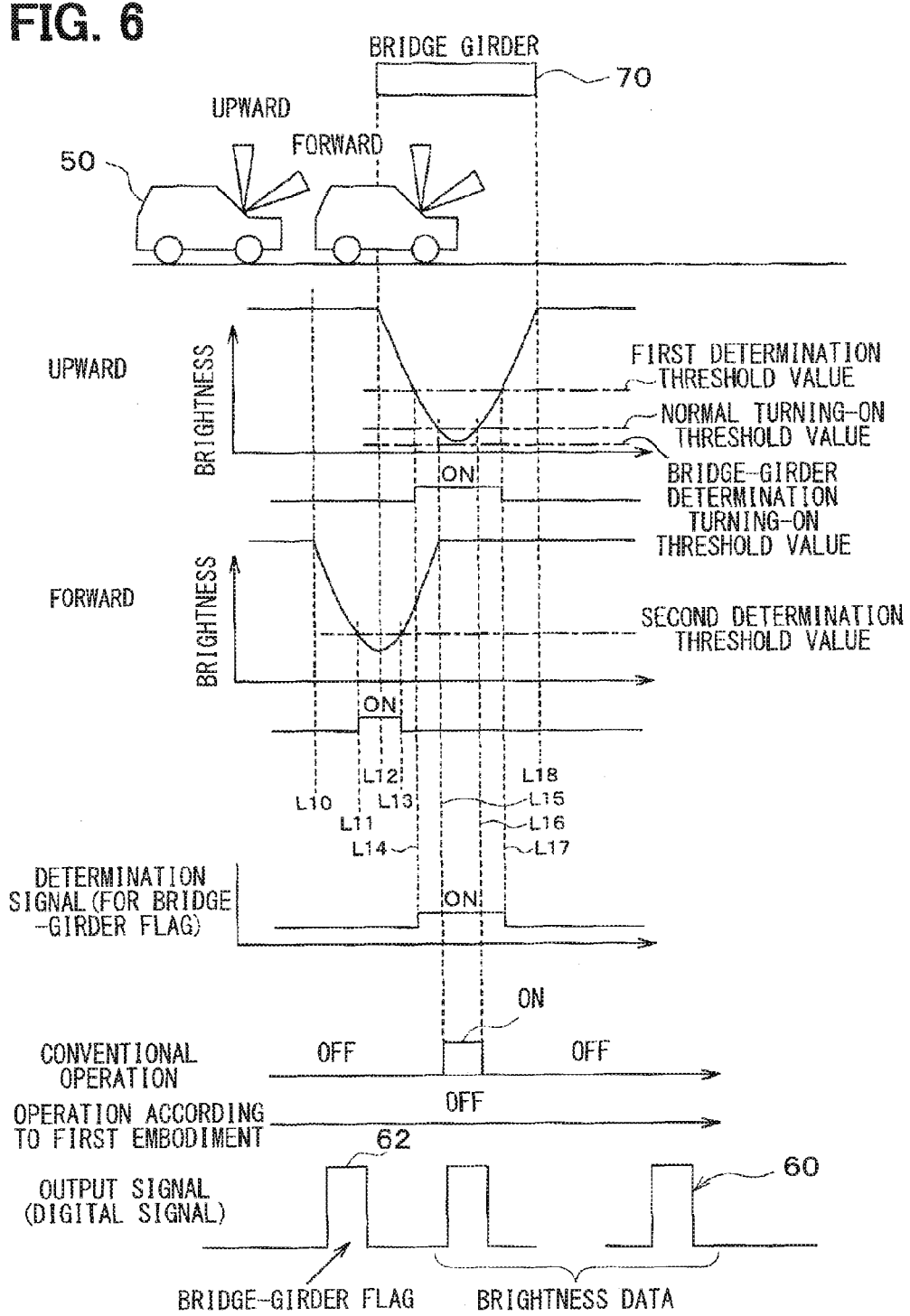
FIG. 6 is a view for explaining operations and signal processing of the automatic light turning on/off system, in a case where the vehicle travels under a bridge girder.

Subsequently, there will be described a case where the vehicle 50 travels under a bridge girder 70 as a shield structure, as illustrated in FIG. 6. At first, at a point L10 at which the vehicle 50 has not entered the bridge girder 70 yet, there is no object intercepting natural light ahead of the vehicle 50 and above the vehicle 50. Therefore, the brightness above the vehicle which is detected by the upward light receiving element 11 is maintained at a value exceeding the normal turning-on threshold value. Accordingly, the light 32 is maintained at an off state. Further, since the bridge girder 70 is positioned ahead of the vehicle 50, the brightness ahead of the vehicle 50, namely, the output of the forward light receiving element 12 starts being lowered.

At a point L11, the vehicle 50 is being positioned near the entrance of the bridge girder 70. Therefore, the upward light receiving element 11 for detecting natural light above the vehicle 50 detects a higher light intensity. On the other hand, since the forward light receiving element 12 for detecting natural light ahead of the vehicle 50 detects a lower light intensity, the output of the forward light receiving element 12 is lowered below the second determination threshold value. Thus, the second comparator 13b in the operational determination circuit portion 13 outputs a high level.

Subsequently, at a point L12, the vehicle 50 starts entering the bridge girder 70. Thus, the intensity of natural light above the vehicle 50 starts being lowered, which starts lowering the output of the upward light receiving element 11.

At a point L13, since the brightness ahead of the vehicle 50 starts increasing, the output of the forward light receiving element 12 exceeds the second determination threshold value. Therefore, after the point L13, the second comparator 13b in the operational determination circuit portion 13 outputs a low level.

Next, as the vehicle 50 proceeds to a center portion of the bridge girder 70, the forward light receiving element 12 receives gradually-increasing light intensities. On the other hand, at a point L14, the upward light receiving element 11 receives a lower light intensity, which lowers the output of the upward light receiving element 11 to below the first determination threshold value. Therefore, the first comparator 13a in the operational determination circuit portion 13 outputs a high level. Accordingly, the first AND circuit 13c outputs a high-level determination signal for providing a bridge-girder flag 62, to the communication output circuit portion 14 in the control ECU 20. That is, the operational determination circuit portion 13 in the light sensor 10 determines that the vehicle 50 is being positioned under the bridge girder 70 based on the over-light signal and the front-light signal and outputs a determination signal including the determination result to the communication output circuit portion 14.

Accordingly, the communication output circuit portion 14 outputs, as an output signal, a frame 61 which has a bridge-girder flag 62 and includes the brightness data 60 of the over-light signal.

On the other hand, the processing circuit portion 22 in the control ECU 20 acquires the bridge-girder flag 62 and the brightness data 60 which are included in the output signal, through the communication input circuit portion 21. Thus, the processing circuit portion 22 changes over from the normal turning-on threshold value to the bridge-girder determination turning-on threshold value. This changeover of the turning-on threshold value is performed immediately after the point L14.

In this case, in the section from a point L15 to a point L16, the brightness above the vehicle 50 is lower than the normal turning-on threshold value. Accordingly, if the turning-on threshold value is not changed over, the processing circuit portion 22 operates the lighting-element circuit portion 30 through the driving circuit portion 23, to turn on the light 32. However, changing over from the normal turning-on threshold value to the bridge-girder determination turning-on threshold value smaller than this normal turning-on threshold value has been performed, as described above. Therefore, in the section from the point L15 to the point L16, the brightness above the vehicle 50 is prevented from being lowered to below the bridge-girder determination turning-on threshold value. Thus, the processing circuit portion 22 does not operate the lighting-element circuit portion 30 through the driving circuit portion 23. The light 32 is maintained at an off state.

Subsequently, as the vehicle 50 gets closer to the exit of the bridge girder 70, the upward light receiving element 11 receives gradually-increasing light intensities. At a point L17, the output of the upward light receiving element 11 exceeds the first determination threshold value, and, therefore, the first comparator 13*a* in the operational determination circuit portion 13 outputs a low level, which causes the first AND circuit 13*c* to output a low level. Accordingly, the operational determination circuit portion 13 in the light sensor 10 determines that the vehicle 50 is not being positioned under the bridge girder 70.

Further, the communication output circuit portion 14 outputs an output signal including no bridge-girder flag 62 to the control ECU 20. Thus, the processing circuit portion 22 restores the bridge-girder determination turning-on threshold value to the original normal turning-on threshold value. The state of a point L18 is the same as that before the point L10, As described above, if the output of the upward light receiving element 11 is lowered to below the first determination threshold value in a state where the output of the forward light receiving element 12 is not lower than the second determination threshold value and during a time period during which the output of the upward light receiving element 11 is lower than the first determination threshold value, the operational determination circuit portion 13 determines that the vehicle 50 is being positioned under the bridge girder 70.

Further, in the situation illustrated in FIG. 6, it is impossible to detect characteristics of a tunnel with the timer 13*f*, the second AND circuit 13*g*, and the flip flop 13*h*. That is, in the case of the bridge girder 70, when the portion above the vehicle 50 has been darkened, the portion ahead of the vehicle has been already darkened, which resets the output of the flip flop 13*h* and causes the third AND circuit 13*i* to output a low level. Therefore, if the vehicle 50 enters the bridge girder 70, the operational determination circuit portion 13 is prevented from determining that the vehicle 50 is being positioned within a tunnel.

Figure 7:
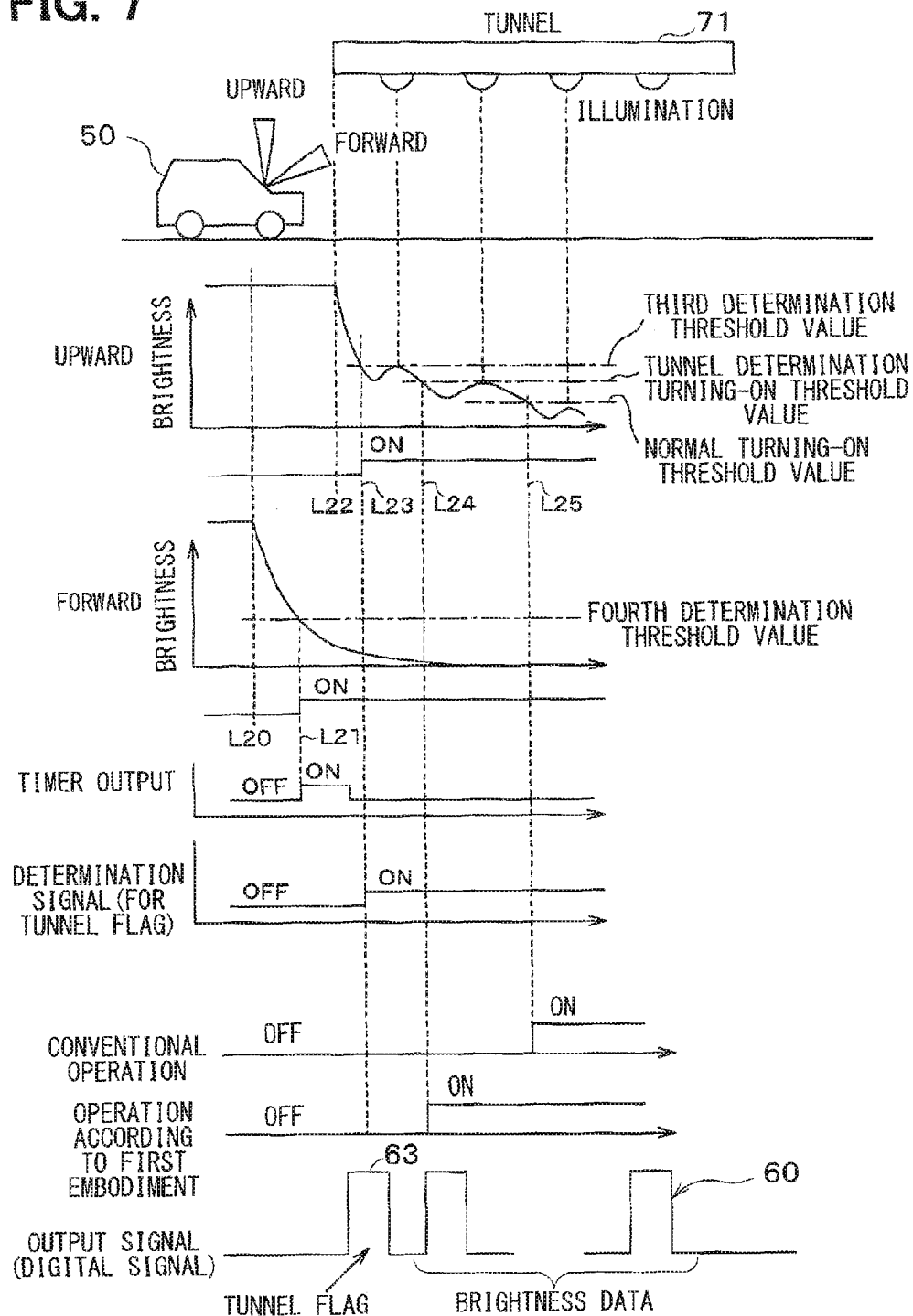
FIG. 7 is a view for explaining operations of the automatic light turning on/off system, in a case where the vehicle travels under a tunnel.

Next, as illustrated in FIG. 7, there will be described a case where the vehicle 50 enters a tunnel 71 as a shield structure. At first, at a point L20 where the vehicle 50 has not entered the tunnel 71 yet, the light 32 is maintained at an off state, similarly to at the aforementioned point L10.

Subsequently, the vehicle 50 moves to the vicinity of the entrance of the tunnel 71. Therefore, similarly to at the point L11 described above, the brightness ahead of the vehicle 50, namely, the output of the forward light receiving element 12 starts being lowered. Further, at a point L21, the output of the forward light receiving element 12 is lowered to below the fourth determination threshold value, which causes the fourth comparator 13*e* in the operational determination circuit portion 13 to output a high level. Further, the timer 13*f* starts counting the predetermined time period. Further, the set terminal in the flip flop 13*h* is set.

At a point L22, the vehicle 50 starts entering the tunnel 71. Thus, since natural light above the vehicle 50 is decreased in intensity, the output of the upward light receiving element 11 starts lowering. Thereafter, as the vehicle 50 further proceeds, the upward light receiving element 11 receives gradually-decreasing light intensities, and the forward light receiving element 12 also receives gradually-decreasing light intensities. Therefore, the output of the upward light receiving element 11 is lowered to below the third determination threshold value, which causes the third comparator 13*d* to output a high-level signal. At a point L23, the timer 13*f* has completed counting of the predetermined time period, which causes the flip flop 13*h* to continuously output the high-level signal from the fourth comparator 13*e*, without resetting the output (Q) of the flip flop 13*h*.

In a case of normal turning-on, the portion above the vehicle 50 and the portion ahead of the vehicle 50 are darkened substantially at the same time. However, when the vehicle 50 has entered the tunnel 71, the portion ahead of the vehicle 50 is darkened and, thereafter, the portion above the vehicle is darkened. Therefore, in order to distinguish the state where the vehicle 50 has entered the tunnel 71 from the normal state, the predetermined time period is counted by the timer 13*f* for determining whether or not the vehicle 50 has entered the tunnel 71 as in FIG. 7.

That is, if the output of the upward light receiving element 11 is lowered to below the third determination threshold value after the timer 13*f* has measured the predetermined time period since the output of the forward light receiving element 12 was lowered to below the fourth determination threshold value, the operational determination circuit portion 13 determines that the vehicle 50 is being positioned under the tunnel 71. Further, during the time period during which the output of the upward light receiving element 11 is lower than the third determination threshold value, the operational determination circuit portion 13 determines that the vehicle 50 is being positioned under the tunnel 71. Further, the operational determination circuit portion 13 outputs a high-level determination signal for providing the tunnel flag 63 to the communication output circuit portion 14 in the control ECU 20.

Accordingly, the communication output circuit portion 14 outputs a frame 61 which has the tunnel flag 63 and includes the brightness data 60 of the over-light signal, as an output signal.

On the other hand, the processing circuit portion 22 in the control ECU 20 acquires the tunnel flag 63 and the brightness data 60 which are included in the output signal, through the communication input circuit portion 21. Thus, the processing circuit portion 22 changes over from the normal turning-on threshold value to the tunnel determination turning-on threshold value. This changeover of the turning-on threshold value is performed immediately after the point L23.

At a point L24, the brightness above the vehicle 50 is lowered to below the tunnel determination turning-on threshold value. Accordingly, the processing circuit portion 22 operates the lighting-element circuit portion 30 through the driving circuit portion 23, to turn on the light 32. On the contrary, if the turning-on threshold value is not changed, at a point L25 after the point L24, the brightness above the vehicle 50 is lowered to below the normal turning-on threshold value. As described above, since the turning-on threshold value has been changed over to the tunnel determination threshold value larger than the normal turning-on threshold value in the present embodiment, it is possible to turning on the light 32 earlier than with conventional techniques, if the vehicle 50 enters the tunnel 71, After the point L25, when the vehicle 50 has come to the vicinity of the exit of the tunnel 71, the forward light receiving element 12 for detecting natural light ahead of the vehicle 50 detects a higher light intensity. Therefore, at least the third comparator 13*d* outputs a low level and, therefore, the operational determination circuit portion 13 in the light sensor 10 determines that the vehicle 50 is not being under the tunnel 71. That is, the communication output circuit portion 14 outputs an output signal including no tunnel flag 63 to the control ECU 20. Thus, the processing circuit portion 22 restores the tunnel determination turning-on threshold value to the original normal turning-on threshold value. Accordingly, when the vehicle 50 has exited the tunnel 71, the light sensor 10 can cause the control ECU 20 to turn off the light 32 in the vehicle 50.

Further, in the situation illustrated in FIG. 7, both the portion above the vehicle 50 and the portion ahead of the vehicle 50 are darkened, which causes the first AND circuit 13*c* to output a low level. Therefore, if the vehicle 50 enters the tunnel 71, the operational determination circuit portion 13 is prevented from determining that the vehicle 50 is being positioned under the bridge girder 70.

As described above, in the present embodiment, when the vehicle 50 is being positioned under a shield structure, the communication output circuit portion 14 in the light sensor 10 outputs, to the control ECU 20, an output signal having a flag for indicating the type of the shield structure, in accordance with the determination result by the operational determination circuit portion 13.

Thus, with the automatic light turning on/off system which employs the light sensor 10, it is possible to cause the control ECU 20 to control turning on or off of the light 32, in accordance with whether the shield structure is the bridge girder 70 or the tunnel 71. Further, if the shield structure is the bridge girder 70, it is possible to prevent the light 32 from being wrongly turned on, Conventionally, a sensor for detecting a bridge girder 70 has been mounted on the front glass of a vehicle 50. However, mounting the sensor on the front glass necessitates a bracket and the like, which involves cost increases. The present light sensor 10 can be mounted on the dash board, and the light sensor 10 can have a reduced size in comparison with conventional sensors, which can improve the mountability of the sensor.

Further, the light receiving elements 11 and 12 in the light sensor 10 can be adapted to output respective signals individually to the control ECU 20. However, this necessitates two output signal lines, which involves an increased cost and degraded mountability. In the present disclosure, the light sensor 10 and the control ECU 20 are connected to each other through a single output signal line, which enables reduction of the cost and improvement of the mountability.

Accordingly, with the automatic light turning on/off system which employs the light sensor 10, it is possible to eliminate the necessity of mounting an additional sensor to the front glass, which enables reduction of the size of the light sensor 10.

Further, in the present embodiment, a flag is set in a head side of a frame 61, as information about the presence of a shield structure and the type of the shield structure. The control ECU 20 reads the flag before reading the brightness data 60, which enables the control ECU 20 to recognize the presence of the shield structure before recognizing the brightness data 60. Therefore, the control ECU 20 can perform processing for determining whether the light 32 is turned on or off, more rapidly.

In the present embodiment, the upward light receiving element 11 corresponds to a first light receiving element, and the light intensity detected by the upward light receiving element 11 corresponds to a first intensity. Further, the forward light receiving element 12 corresponds to a second light receiving element, and the light intensity detected by the forward light receiving element 12 corresponds to a second intensity.

Further, the over-light signal corresponds to a first intensity signal, and the front-light signal corresponds to a second intensity signal. The control ECU 20 corresponds to a control unit. Further, the bridge-girder flag 62 corresponds to a second flag, and the tunnel flag 63 corresponds to a first flag. The brightness data 60 corresponds to data.

(Second Embodiment)

Figure 8:
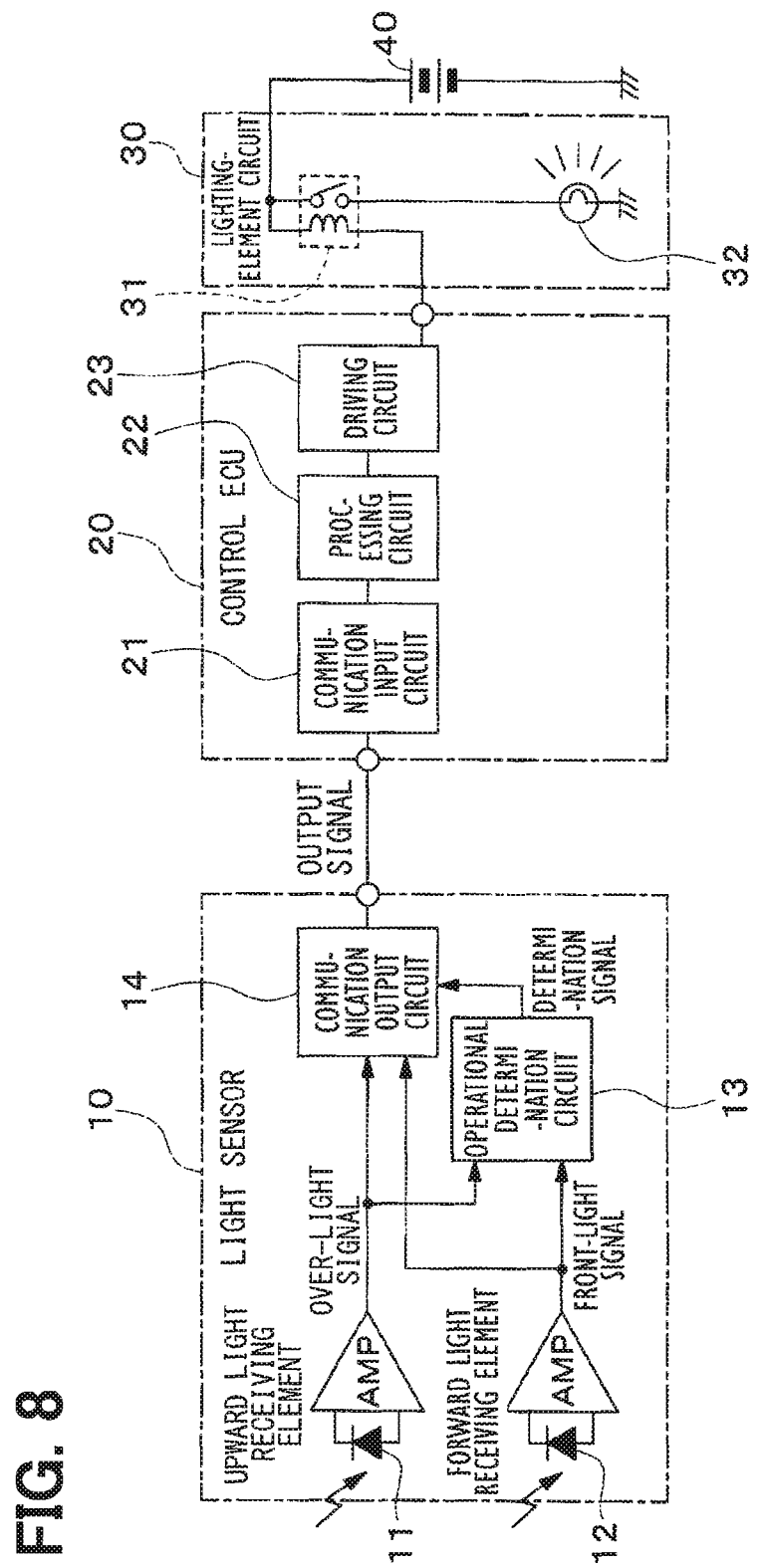
FIG. 8 is a view of the structure of an automatic light turning on/off system including a light sensor according to a second embodiment of the present disclosure.

In the present embodiment, only different portions from the first embodiment will be described. As illustrated in FIG. 8, in the present embodiment, a front-light signal from a forward light receiving element 12 is inputted to both an operational determination circuit portion 13 and a communication output circuit portion 14.

The communication output circuit portion 14 performs calculation based on the brightness above a vehicle 50, which is indicated by an over-light signal, and the brightness ahead of the vehicle 50, which is indicated by the front-light signal. Further, the communication output circuit portion 14 generates an output signal including the calculation result. The communication output circuit portion 14 performs calculation for adding the brightness and averaging the brightness, for example. Further, the communication output circuit portion 14 outputs the output signal to the control ECU 20. On the other hand, a processing circuit portion 22 in the control ECU 20 changes a threshold value in accordance with the calculation result regarding the brightness.

In the aforementioned way, the control ECU 20 is enabled to control turning on or off of a light 32, in consideration of light ahead of the vehicle 50, as well as light above the vehicle 50. This enables controlling turning on and off of the light 32 more accurately in accordance with the condition around the vehicle 50.

(Other Embodiments)

The structures of the light sensors 10 described in the aforementioned respective embodiments are merely illustrative, and the light sensor 10 is not limited to the aforementioned structures and can have other structures capable of realizing the present disclosure. For example, the structure of the operational determination circuit portion 13 is merely illustrative, and the structure can be properly changed in such a way as to provide the same functions as those described above. The control ECU 20 can be any ECU mounted on the vehicle 50. Further, the light sensor 10 can be structured to include no control ECU 20.

In the aforementioned embodiments, the tunnel flag 63 or the bridge-girder flag 62 is set in the frame 61 as information indicative of the type of the shield structure. However, the flags 62 and 63 are merely an example of information indicative of the type of the shield structure. Accordingly, information indicative of the shield structure can be expressed by other methods.

In the aforementioned embodiments, the light sensor 10 outputs the output signal including the brightness data 60 to the control ECU 20. However, for example, the light sensor 10 can output an output signal which has only the flag 62 or 63 set therein, without including brightness data 60.

In the aforementioned embodiments, the tunnel flag 63 or the bridge-girder flag 62 is set in the frame 61 ahead of the brightness data 60, but can be set after the brightness data 60. Further, the flag 62 or 63 can be set between two or more split pieces of brightness data 60.

In the second embodiment, the communication output circuit portion 14 performs calculation based on both the brightness above the vehicle 50 and the brightness ahead of the vehicle 50. However, the communication output circuit portion 14 can be adapted to generate an output signal including only one of the brightness above the vehicle 50 and the brightness ahead of the vehicle 50.

The invention claimed is:

1. A light sensor comprising:
a first light receiving element that outputs a first intensity signal indicative of a first intensity which is an intensity of light irradiated from above a vehicle;
a second light receiving element that outputs a second intensity signal indicative of a second intensity which is an intensity of light irradiated from ahead of the vehicle;
an operational determination circuit that receives the first intensity signal from the first light receiving element and the second intensity signal from the second light receiving element, determines based on the first intensity signal and the second intensity signal whether the vehicle is positioned under a shield structure for intercepting sunlight, determines whether it is necessary to turn on a light in the vehicle for the shield structure when the vehicle is positioned under the shield structure, and outputs a result of determination as a determination signal; and
a communication output circuit that receives the first intensity signal from the first light receiving element and the determination signal from the operational determination circuit portion, generates an output signal having information about the first intensity indicated by the first intensity signal, and outputs the output signal to a control unit for controlling to turn on or off the light based on the output signal, wherein:
the communication output circuit outputs the output signal to the control unit, the output signal including information whether it is necessary to turn on the light for the shield structure when the vehicle is positioned under the shield structure.

2. The light sensor according to claim 1, wherein:
the communication output circuit outputs the output signal to the control unit, the output signal including information indicating that the vehicle is not positioned under the shield structure when the operational determination circuit determines that the vehicle is not positioned under the shield structure after the operational determination circuit determines that the vehicle is positioned under the shield structure.

3. The light sensor according to claim 1, wherein:
the communication output circuit generates, as the output signal, a frame for storing data of the first intensity indicated by the first intensity signal, and outputs the frame to the control unit;
the communication output circuit further sets a first flag as the information in the frame, the first flag indicating that it is necessary to turn on the light for the shield structure, and outputs the frame when the vehicle is positioned under the shield structure and it is necessary to turn on the light for the shield structure;
the communication output circuit further sets a second flag as the information in the frame, the second flag indicating that it is not necessary to turn on the light for the shield structure, and outputs the frame when the vehicle is positioned under the shield structure and it is not necessary to turn on the light for the shield structure;
the communication output circuit outputs the frame without setting the first flag and the second flag in the frame when the vehicle is not positioned under the shield structure; and
the first flag and the second flag are arranged ahead of the data of the first intensity in the frame.

4. The light sensor according to claim 1, wherein:
the communication output circuit receives the second intensity signal from the second light receiving element, generates, as the output signal, a signal including one of the first intensity indicated by the first intensity signal and the second intensity indicated by the second intensity signal, or a calculation result based on the first intensity and the second intensity, and outputs the output signal to the control unit.

5. The light sensor according to claim 1, wherein:
the operational determination circuit compares the first intensity signal and a first determination threshold value, and compares the second intensity signal and a second determination threshold value; and
when the first intensity signal falls below the first determination threshold value in a state where the second intensity signal does not fall below the second determination threshold value, the operational determination circuit determines that the vehicle is positioned under a bridge girder as the shield structure, and outputs a determination result as the determination signal to the communication output circuit, the determination result indicating that the vehicle is positioned under the bridge girder, while the first intensity signal falls below the first determination threshold value.

6. The light sensor according to claim 1, wherein:
the operational determination circuit compares the first intensity signal and a third determination threshold value, and compares the second intensity signal and a fourth determination threshold value;
the operational determination circuit further includes a timer (13*f*) for measuring a predetermined time period after the second intensity signal falls below the fourth determination threshold value; and
when the first intensity signal falls below the third determination threshold value after the timer (13*f*) measures the predetermined time period since the second intensity signal falls below the fourth determination threshold value, the operational determination circuit determines that the vehicle is positioned under a tunnel as the shield structure, and outputs a determination result as the determination signal to the communication output circuit, the determination result indicating that the vehicle is positioned under the tunnel, while the first intensity signal falls below the third determination threshold value.

7. The light sensor according to claim 1, further comprising:
the control unit, wherein:
the first light receiving element, the second light receiving element, the operational determination circuit, and the communication output circuit are packaged into a single component;
the control unit has a threshold value for determining whether the light in the vehicle is to be turned on;

when the output signal falls below the threshold value, the control unit turns on the light in the vehicle; and when the output signal includes information whether it is necessary to turn on the light for the shield structure, the control unit changes the threshold value in accordance with the information.

* * * * *